United States Patent
Ashill et al.

[11] Patent Number: 5,433,404
[45] Date of Patent: Jul. 18, 1995

[54] AIRFOIL WITH VARIABLE GEOMETRY EXPANSION SURFACE

[75] Inventors: Patrick R. Ashill; John L. Fulker, both of Bedfordshire, England

[73] Assignee: The Secretary of State for Defence in Her Britannic Majesty's Government of the United Kingdom of Great Britain and Northern Ireland, London, England

[21] Appl. No.: 190,052
[22] PCT Filed: Jul. 28, 1992
[86] PCT No.: PCT/GB92/01396
 § 371 Date: May 25, 1994
 § 102(e) Date: May 25, 1994
[87] PCT Pub. No.: WO93/02915
 PCT Pub. Date: Feb. 18, 1993

[30] Foreign Application Priority Data
Aug. 1, 1991 [GB] United Kingdom ............... 9116787

[51] Int. Cl.⁶ .............................................. B64C 3/44
[52] U.S. Cl. .................................... 244/200; 244/204; 244/219
[58] Field of Search .............. 244/198, 204, 200, 219, 244/35 A, 130

[56] References Cited
U.S. PATENT DOCUMENTS

| | | | |
|---|---|---|---|
| 2,349,858 | 5/1944 | Gillnor | 244/219 |
| 2,364,006 | 11/1944 | Smith | 244/219 |
| 3,158,338 | 11/1964 | Cushman | 244/219 |
| 4,296,900 | 10/1981 | Krall | 244/219 |
| 4,522,360 | 6/1985 | Barwell et al. | 244/204 |

FOREIGN PATENT DOCUMENTS

| | | | |
|---|---|---|---|
| 0283730 | 9/1988 | European Pat. Off. | |
| 2277723 | 7/1974 | France | 244/219 |
| 3320481 | 12/1984 | Germany | 244/219 |
| 4007694 | 9/1991 | Germany | 244/219 |
| 722847 | 2/1955 | United Kingdom | |
| 880888 | 2/1959 | United Kingdom | |

*Primary Examiner*—Galen L. Barefoot
*Attorney, Agent, or Firm*—Nixon & Vanderhye

[57] ABSTRACT

A wing, or similar article of airfoil section, has a variable geometry surface for the active control of shock strength and transonic wave drag. In one embodiment, the wing has a region of distensible skin (4) aft of the line of maximum section, which extends along the span of the wing in those areas that experience drag. Pressure means (10, 20, 30) within the wing outwardly deflect the distensible region and produce a local bulge in the expansion surface. This bulge induces pre-shock compression and reduces the effect of the shock. The bulge is retracted by the natural elasticity of the skin material (which can be a conventional aluminum alloy) upon removal of the applied pressure. In another embodiment, the wing has a ramp portion (14) which is outwardly deflectable for the same purpose. The invention is applicable to supercritical and natural laminar flow wings.

9 Claims, 3 Drawing Sheets

EFFECT OF UPPER SURFACE DISTORTION
ON PRESSURE DISTRIBUTION AND DRAG

AIRFOIL WITH VARIABLE GEOMETRY EXPANSION SURFACE

BACKGROUND OF THE INVENTION

1. Field of the Invention

The present invention relates to an article, such as an aircraft wing, having an aerofoil section with a variable geometry expansion surface for the control of shock strength.

The invention is particularly applicable to wings for transport aircraft where it is intended to combat transonic wave drag, to which such wings are susceptible when the aircraft is flown in off-design conditions. However, the invention may also find use in the wings of other aircraft types as well as possibly for control surfaces rather than wings.

2. DISCUSSION OF PRIOR ART

It is well known that air-flows over aircraft wings at high subsonic free stream Mach numbers exhibit shock waves due to localised excursions into supersonic flow. The supercritical wing forms of modern transport aircraft ensure that the effects of such shock waves are minimised at the design cruise Mach number, altitude and coefficient of lift. However, it is recognised that these shock waves can increase significantly in strength with small departures from the design conditions, such as a change in the angle of incidence or an increase in Mach number. These shock waves create drag, which is known as transonic wave drag, and can lead to the breakdown of ordered flow. Operation under these conditions is obviously undesirable since it increases aircraft fuel consumption. Moreover, the flow breakdown may cause problems of aircraft control or reduction in aircraft structural life through buffet loading.

In other, non-supercritical, wing sections designed for natural laminar flow, the aerofoil section necessary to maintain the laminar boundary layer as far aft as possible (for the benefit in drag reduction that this conveys) produces transonic wave drag which unfortunately increases rapidly in strength as either Mach number or lift coefficient rise above the design condition value. This places a severe limitation on the operating band of Mach numbers and lift coefficients for laminar flow aircraft.

Various solutions have been proposed to alleviate the problem of transonic wave drag associated with aircraft wings. One approach has been to incorporate perforations or slots in the expansion surface of the wing at both the upstream and downstream sides of the shock location, with these being linked through a plenum chamber inside the wing. This arrangement makes use of the pressure differential that exists in the airflow adjacent the wing. Air is bled from the higher pressure region downstream of the shock and reintroduced in jets upstream of the shock. These jets create a ramp to oncoming flow and thereby cause compression waves which weaken the shock. One of the drawbacks of this solution is that a boundary layer drag penalty is imposed across the entire range of flight conditions, due to the presence of these holes or slots. This drag penalty may outweigh the advantage gained by reduction of transonic wave drag in terms of overall operating costs.

Another approach to reduction of transonic wave drag and associated buffeting is to configure the aerofoil section so as to produce the same pre-shock compression achieved by the method described above. For example, at page 673 of the Journal of Aircraft Volume 25, No 8, dated August 1988, Tai and co-workers disclose an aerofoil with a bulge on the expansion surface at a position approximating to that of the shock wave.

However all aerofoil sections represent a compromise between various conflicting requirements and it is unlikely that any specific configuration optimised with this specific end in view would have a beneficial or neutral effect across the whole range of flight conditions. It is more likely to be the case that, in securing a reduction in the off-design point wave drag, some increase in viscous or wave drag is caused at another condition. Accordingly it is unlikely that a wing of this nature would be of such advantage as to extend the flight envelope whilst reducing overall fuel consumption.

SUMMARY OF THE INVENTION

The present invention provides an aerofoil form with a variable geometry region within its expansion surface which can be deployed to project beyond the normal outline of the aerofoil when in certain flight regimes, yet which can be withdrawn at other times to minimise boundary layer drag.

The invention is a shock reducing device for an article of aerofoil section, said device comprising means for varying the thickness of the article in comparison with its undeformed state, characterised in that the variation in thickness is confined to a region of the expansion surface of the article, said region being centred aft of the line of maximum section of the article but forward of the trailing edge and extending along at least part of the span of the article, an outward deflection of said region serving to produce a shock reducing variation in the expansion surface of the article.

The variable geometry region is positioned ahead of the trailing edge (i.e. upstream of any trailing edge flaps or control surfaces) at a chordwise position such that there is some outward displacement of the expansion surface upstream of the position of the shock so as to cause pre-compression of the flow ahead of the shock.

In some articles of aerofoil section, such as wings of laminar flow section, the shock does not change chordal position significantly with change in flight conditions so the variable geometry region can be centred on the expected position of the shock. For such a laminar flow aerofoil section, with the shock position at around 50% chord, satisfactory results have been obtained across a wide range of flight conditions using a variable geometry region extending from 45% to 65% chord. However, for a wing of the alternative supercritical section, the shock position can vary between 50% and 60% chord according to flight condition. For such aerofoil sections, a variable geometry region extending from 40% to 70% chord would cover the variation in shock position, but for best results the pressure means would need to be capable of moving the centre of variation according to the anticipated or detected position of the shock for a given flight condition, and activated accordingly.

The variable geometry region can be incorporated into the article at any spanwise location wherein the article is subject to shock which increases in strength with departure from design conditions. This can be in the inboard portion of the wing in certain modern transport aircraft (i.e. inboard of the trailing edge crank) but can also be the outboard portion of the wing in other aircraft or aircraft wing forms.

The degree of deflection required to combat transonic wave drag is quite small in relation to the thickness of the article. This is likely to be 0.4% at most of the local chord. With this small degree of deflection as the requirement the degree of elastic deformation demanded of the pertinent region of material might well be within the compass of current metal or reinforced plastics skinning materials when linked to appropriate pressure means.

In one form of the invention, the pressure means comprises a pressurisable chamber within the article beneath a band of distensible skin and means to cause pressurisation of the chamber to a degree sufficient to produce the required distension. This pressurisation may be accomplished by pneumatic or fluidic means coupled to the aircraft controls or automatically activated by means of the aircraft air data system.

The invention may comprise mechanical pressure means as an alternative to the pressurisable chamber discussed above. This can utilise one of several forms of mechanical pushing device, such as cams or jacks. Several of these would be used in a co-ordinated manner to produce the required distension of the skin. These mechanical Forms of pressure means have the advantage that they apply the distending pressure at particular points on the skin. By actuating individual jacks or cams to different extents, the centre of distension can be adjusted to accommodate variation in shock position such as that discussed previously in the context of supercritical wing sections.

It is believed that the precise form taken by the distensible skin when deflected is not crucial to the success of the article in combating transonic wave drag. At present there seems to be no reason to depart from a simple smooth curve profile. However, as the Mach number is increased for a given lift coefficient, the normal shock wave may move downstream. This depends on the particular aerofoil configuration under consideration. Thus a distended skin having a crest at a fixed chordwise position may become less effective as the Mach number is increased. In fact, this approach can even make matters worse where buffet onset is concerned. In the event that the requirement of adequate margin between buffet onset Mach number and Mach number at cruise lift coefficient proves critical, a different approach may be necessary.

In an alternative form of the invention, the variable geometry region comprises a ramp which is actuable to a position where it projects beyond the undeformed profile of the article. Using such a device, the crest of the deflected portion can be effectively moved downstream of the trailing edge. In its simplest manifestation, the ramp is a simple spoiler, which device is thought to be particularly effective in reducing buffet. However, calculations indicate that such devices confer minimal drag reduction due to the separation bubble which occurs downstream of the spoiler. An especially preferred form of ramp device includes an integral fairing which closes off the region downstream of the ramp and minimises the degree of flow separation which occurs. This preferred form can also be designed to work in a spoiler mode, for example during descent and landing when increased drag is desired, by deploying itself as a single continuous plane.

BRIEF DESCRIPTION OF THE DRAWINGS

The invention will now by described by way of example with reference to the drawings in which.

DETAILED DESCRIPTION OF THE PREFERRED EMBODIMENTS

Figure 1:
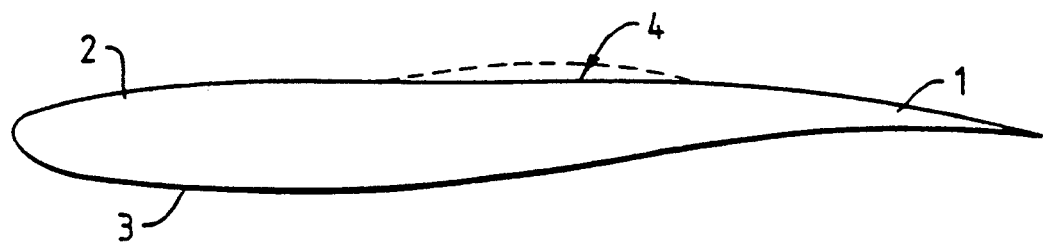
FIG. 1 shows a schematic representation of a wing in chordal section.

The aerofoil section is depicted in all drawings using common reference numerals for common parts. The article having aerofoil element comprises an aircraft wing, generally designated 1, of supercritical form. Its expansion surface is designated 2 and the pressure surface designated 3. Within the skin of the expansion surface 2 there is a region 4 of elastically distensible material which comprises one of the established aerospace alloys based upon aluminium, such as the aluminium-copper alloy designated AA2124. This region 4 is set into the expansion surface so that there is an absence of overlap ridges, in order to minimise skin friction drag. The distensible region extends in a band along at least part of the span of the wing 1 over a chordal zone between 0.35 chord and 0.65 chord (measured from the leading edge), being centred at a line through 0.5 chord. This region 4 is configured and driven such that it produces a bulge from the normal profile expansion surface 2 which, at its high point, projects outwardly by a distance of 0.25% wing chord.

Figure 2:
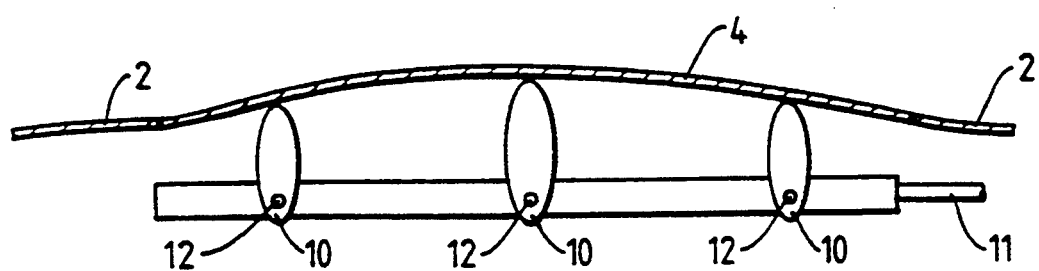
FIG. 2 is a part-sectional view of a first embodiment of the invention showing a system of cams effective to distend the wing skin.

The wing illustrated in FIG. 2 has a pressure means in the form of a series of co-ordinated cams 10 driven by a common lead-screw 11. The lead-screw 11 is rotated by a motor 12 to produce the required skin distension of region 4.

Figure 3:
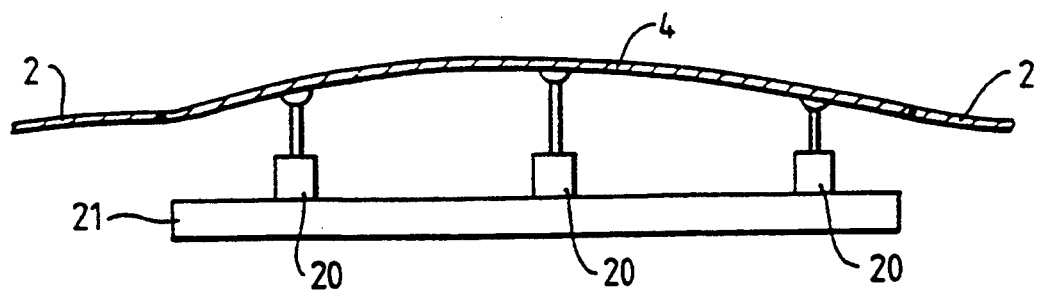
FIG. 3 is an alternative embodiment which uses hydraulic jacks.

The wing illustrated in FIG. 3 has a pressure means in the form of a series of co-ordinated jacks 20 supported by structural member 21. These may be electrically or hydraulically driven.

Figure 4:
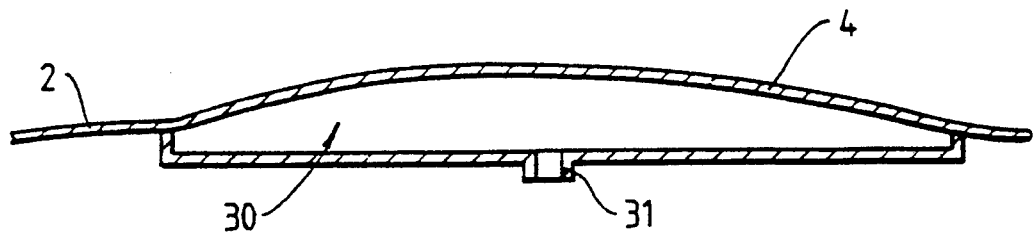
FIG. 4 gives a part-sectional view of the invention utilising pressurisable chamber means.

An alternative version of the invention is depicted in FIG. 4. This form of wing has a pressurisable chamber 30 within the section of the wing and the material of region 4 is such that pressurisation of chamber 30 causes the required degree of outward distension to produce the 0.25% chord bulge. In this embodiment, there is an internal feed pipe 31 through which pressurising fluid is introduced to chamber 30 by means of a pump (not shown).

Figure 5:
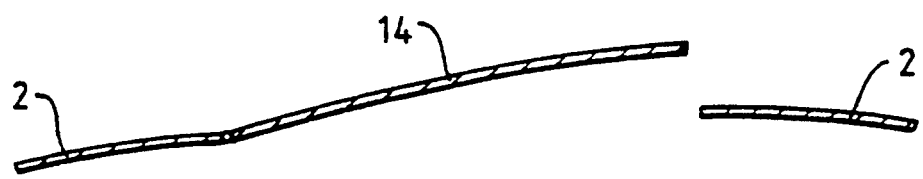
FIG. 5 is a part-sectional view of another embodiment of the invention.

In the embodiment depicted in FIG. 5, the region of variable geometry comprises a ramp or spoiler device 14. As shown, this device is open at the downstream end when deployed, allowing a bubble of essentially trapped air to form here. The benefit of reduced drag is not very great owing to this Flow separation, but reduction in buffet excitation is significant.

Figure 6:
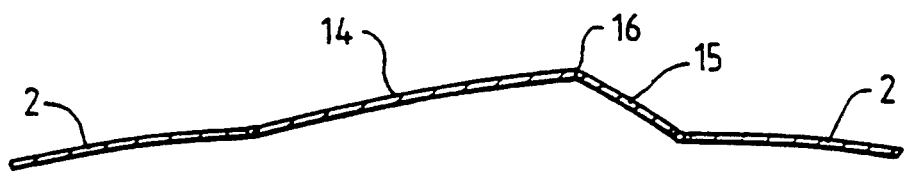
FIG. 6 is a part-sectional view of a preferred form of the invention shown in FIG. 5.

FIG. 6 shows an especially preferred form of the ramp device, in which the ramp 14 is complemented by a fairing 15 which closes off the region downstream of the ramp. This reduces flow separation to a negligible level so that it no longer has a negative affect on the wave drag reduction achieved by the invention. The ramp 14 and fairing 15 are hinged at 16 and, as the ramp is moved outward into the flow, the trailing edge of the fairing 15 is constrained to remain in contact with the wing surface 2. In certain circumstances. For example during descent and landing, the ramp and fairing combination can be deployed in a spoiler mode in which they form a unitary continuous plane element similar to the spoiler depicted in FIG. 5.

Actuation of such ramp devices is preferably performed by mechanical means such as cams or jacks.

Figure 7:
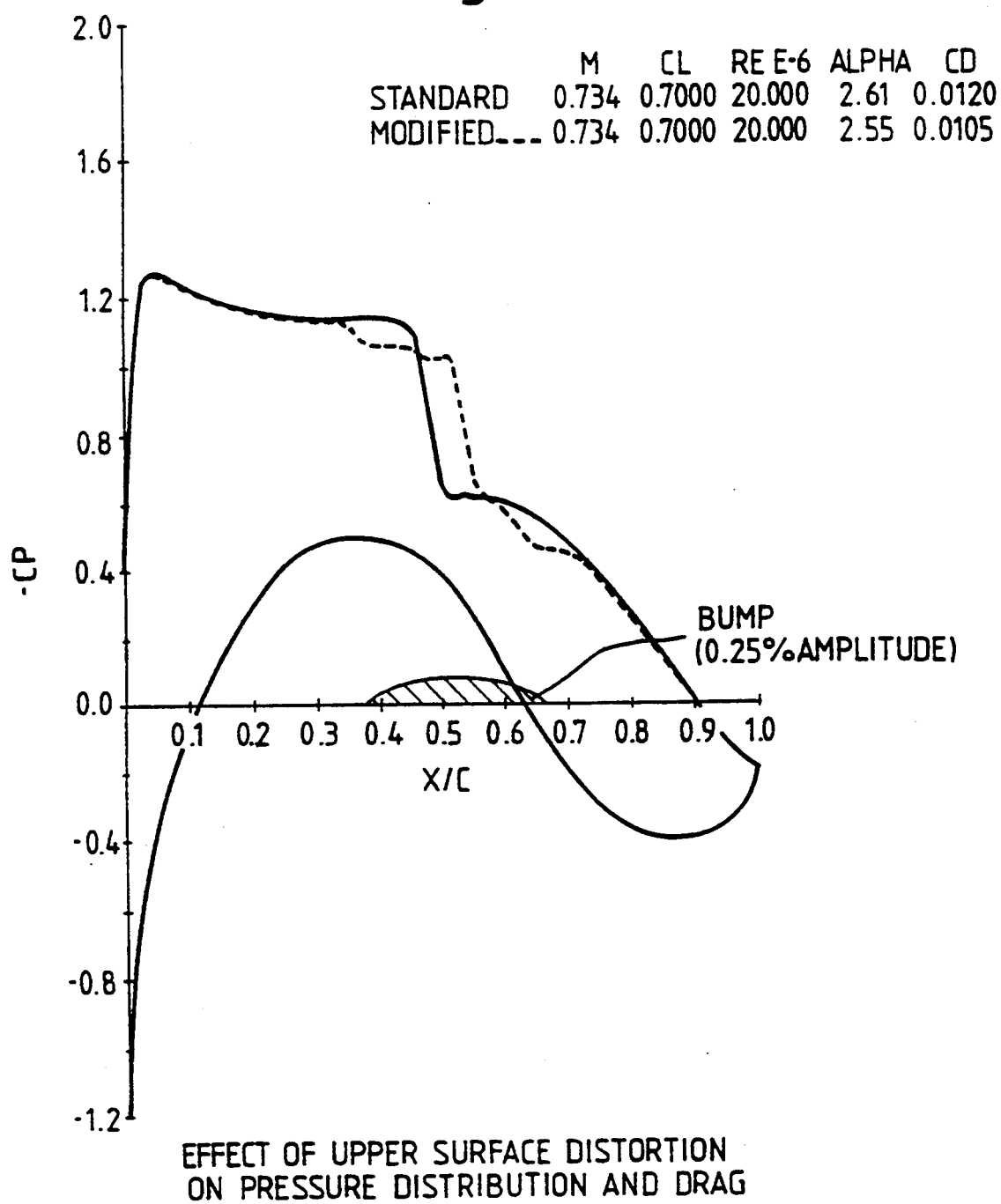
FIG. 7 is a data table and plot showing the effectiveness of a particular bulge-form on a specified aerofoil configuration.

FIG. 7 records the effectiveness of a particular bulge geometry. The data shown in this Figure is modelling data secured by use of a well-proven two dimensional code. The plot of coefficient of pressure shows that the presence of the bulge decreases the magnitude of the pressure differential across the shock line and pushes this line in a rearward direction. The table of data reveals that, for a common coefficient of lift (0.7) at a common Mach number (0.734), the bulged configuration reduces the coefficient of drag from 0.0120 to 0.0105, i.e. a reduction of 13%. The coefficient of drag recorded here represents the overall drag experienced by the specified aerofoil section. Thus, the noted decrease in overall drag indicates that the reduction in wave drag is not achieved at the expense of a counter-productive increase in viscous drag.

We claim:

1. A shock reducing device for an article of airfoil section, said airfoil section having an expansion surface during transonic airflow conditions, said device comprising means for locally increasing the steady state thickness of the article in comparison with said article in an undeformed state, wherein said increase in thickness is located in a region of the expansion surface of the article, said region being centered aft of the line of maximum section of the article but forward of the trailing edge and extending along at least part of the span of the article, wherein said increased steady state thickness in said region comprising a means for producing a shock reducing variation in the expansion surface of the article.

2. A device as claimed in claim 1, wherein the article is an aircraft wing in which a region of increased steady static thickness occupies a chordal position between the forward limit of 40% chord and the rearward limit of 70% chord.

3. A device as claimed in claim 1, wherein the article is an aircraft wing of a natural laminar flow section in which a region of increased steady static thickness extends from a forward chordal position at 45% chord to a rearward chordal position of 65% chord.

4. A device as claimed in claim 1, wherein the means for locally increasing the steady state thickness of the article is capable of moving a center of increasing thickness in a chordal direction.

5. A device as claimed in claim 1, wherein a region of increased steady state thickness comprises a distensible skin portion and further includes a means for effecting deflection of the distensible skin portion.

6. A device as claimed in claim 5, wherein the means for effecting deflection of the distensible skin portion comprises an array of mechanical pushing devices.

7. A device as claimed in claim 5, wherein the means for effecting deflection of the distensible skin portion comprises a pressurizable chamber within the article together with a means for causing fluidic pressurization of this chamber.

8. A device as claimed in claim 1, wherein the region of variable thickness comprises a ramp actuated by an array of mechanical pushing devices.

9. A device as claimed in claim 8, wherein the ramp has an integral fairing which closes off the region downstream of the ramp trailing edge when the ramp is deployed.

* * * * *